(12) United States Patent
Parizat et al.

(10) Patent No.: US 11,414,534 B2
(45) Date of Patent: Aug. 16, 2022

(54) MULTIFUNCTIONAL OPTICALLY HIGHLY TRANSPARENT FILMS AND METHOD FOR THEIR PRODUCTION

(71) Applicant: ISLAND POLYMER INDUSTRIES GMBH, Bitterfeld-Wolfen (DE)

(72) Inventors: Amnon Parizat, New York, NY (US); Gernod Haerter, Bitterfeld-Wolfen (DE); Silvio Boettcher, Leipzig (DE); Anne Pils, Delitzsch (DE)

(73) Assignee: Island Polymer Industries GmbH, Bitterfeld-Wolfen (DE)

( * ) Notice: Subject to any disclaimer, the term of this patent is extended or adjusted under 35 U.S.C. 154(b) by 106 days.

(21) Appl. No.: 15/553,447

(22) PCT Filed: Feb. 25, 2016

(86) PCT No.: PCT/DE2016/000080
§ 371 (c)(1),
(2) Date: Aug. 24, 2017

(87) PCT Pub. No.: WO2016/134688
PCT Pub. Date: Sep. 1, 2016

(65) Prior Publication Data
US 2018/0265680 A1    Sep. 20, 2018

(30) Foreign Application Priority Data
Feb. 27, 2015    (DE) .................... 10 2015 003 005.1

(51) Int. Cl.
*C08L 1/12*    (2006.01)
*C08J 5/18*    (2006.01)
(Continued)

(52) U.S. Cl.
CPC . *C08L 1/12* (2013.01); *C08J 5/18* (2013.01); *C08K 5/1545* (2013.01);
(Continued)

(58) Field of Classification Search
CPC ........ C08L 1/12; C08L 1/10; C08L 2205/025; C08L 2203/16; C09K 11/06;
(Continued)

(56) References Cited

U.S. PATENT DOCUMENTS

| 3,489,584 A | 1/1970 | Kobayashi |
| 5,152,947 A | 10/1992 | Takeda |

(Continued)

FOREIGN PATENT DOCUMENTS

| DE | 1 694 679 | 6/1966 |
| DE | 102011117270 | 5/2013 |

(Continued)

OTHER PUBLICATIONS

EPO Translation of JP-W02013080514-A1 (Year: 2019).*
(Continued)

*Primary Examiner* — Michael Zhang
(74) *Attorney, Agent, or Firm* — Ursula B. Day, Esq.

(57) ABSTRACT

Multifunctional optically highly transparent films based on cellulose esters are disclosed, having the following components within a film a) cellulose esters preferably based on cellulose triacetate which can be processed into a highly transparent film with Haze value of < than 0.4% by virtue of a high degree of purity and optical quality and which is defined by the following properties b) at least one organic or inorganic material which acts as a plasticizer and as a spacer between the molecule chains of the cellulose esters and additionally introduced additives in a synergistically effective manner c) at least three organic or inorganic materials with a transmission influencing absorptive function in the wave length range of 300 nm to 2500 nm, the films having protective strain reducing function for the retina of the human eye.

14 Claims, 1 Drawing Sheet

(51) Int. Cl.
- *C08K 5/3492* (2006.01)
- *C08L 1/10* (2006.01)
- *C08K 5/1545* (2006.01)
- *C08K 5/3437* (2006.01)
- *C08K 5/3475* (2006.01)
- *C08K 5/527* (2006.01)
- *C09K 11/06* (2006.01)

(52) U.S. Cl.
CPC .......... *C08K 5/3437* (2013.01); *C08K 5/3475* (2013.01); *C08K 5/3492* (2013.01); *C08K 5/527* (2013.01); *C08L 1/10* (2013.01); *C09K 11/06* (2013.01); *C08J 2301/12* (2013.01); *C08J 2401/12* (2013.01); *C08K 2201/005* (2013.01); *C08L 2203/16* (2013.01); *C08L 2205/025* (2013.01); *C09K 2211/1018* (2013.01)

(58) Field of Classification Search
CPC ............ C09K 2211/1018; C08K 5/527; C08K 5/3475; C08K 5/3437; C08K 5/1545; C08K 2201/005; C08K 5/3492; C08J 5/18; C08J 2401/12
See application file for complete search history.

(56) References Cited

U.S. PATENT DOCUMENTS

| | | |
|---|---|---|
| 2006/0069192 A1 | 3/2006 | Nakamura |
| 2006/0105155 A1* | 5/2006 | Ikeyama .............. G02B 5/0226 428/220 |
| 2008/0233311 A1* | 9/2008 | Tamagawa ................ C08L 1/14 428/1.31 |
| 2008/0254236 A1 | 10/2008 | Kawanishi |
| 2009/0036667 A1* | 2/2009 | Hashimoto ........... B29C 55/045 536/69 |
| 2010/0233389 A1* | 9/2010 | Suzuki ........................ C08J 5/18 428/1.33 |
| 2015/0135990 A1 | 5/2015 | Harada |

FOREIGN PATENT DOCUMENTS

| | | | |
|---|---|---|---|
| EP | 0 708 135 | 4/1996 | |
| JP | 2001154017 A * | 6/2001 | |
| JP | 2002 144357 | 5/2002 | |
| JP | 2003 161807 | 6/2003 | |
| JP | 2005 104149 | 4/2005 | |
| JP | WO2013080514 A1 * | 4/2015 | ............. G02B 1/105 |
| WO | WO2006/101251 | 9/2006 | |

OTHER PUBLICATIONS

Espacenet Translation of JP-2001154017-A (Year: 2019).*
PolymerDatabase, "Cellulose Acetate Films," http://polymerdatabase.com/Polymer%20Brands/Cellulose%20Acetate.html (Year: 2021).*
International Search Report issued by the European Patent Office in International Application PCT/DE2016/000080 dated Feb. 25, 2016.

* cited by examiner

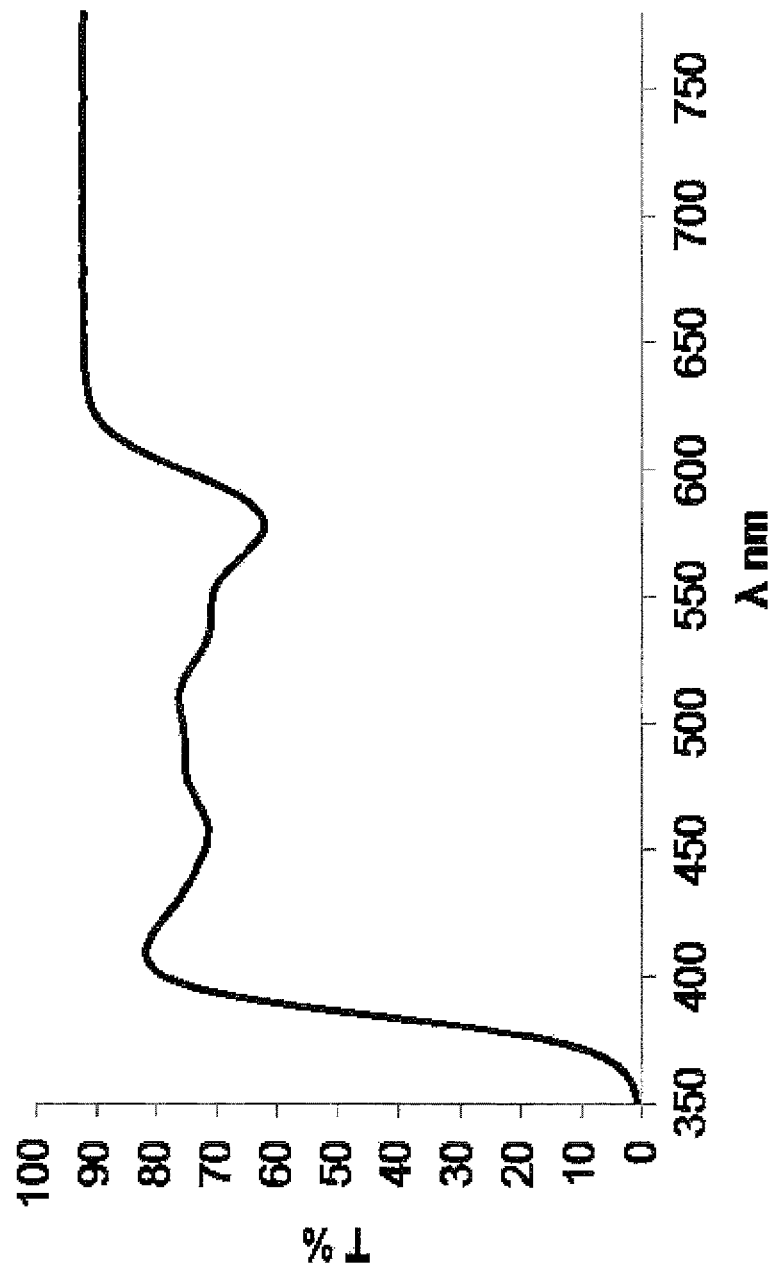

MULTIFUNCTIONAL OPTICALLY HIGHLY TRANSPARENT FILMS AND METHOD FOR THEIR PRODUCTION

CROSS-REFERENCES TO RELATED APPLICATIONS

This application is the U.S. National Stage of International Application No. PCT/DE2016/000080, filed Feb. 25, 2016, which designated the United States and has been published as International Publication No. WO 2016/134688 and which claims the priority of German Patent Application, Serial No. 10 2015 003 005.1, filed Feb. 27, 2015, pursuant to 35 U.S.C. 119(a)-(d) the description of which is hereby incorporated by reference.

BACKGROUND OF THE INVENTION

The present invention refers to multifunctional optically highly transparent films, that is, optically and from an technical standpoint multifunctional films, based on cellulose derivatives, in particular triacetate cellulose that can be utilized as protective films against sunlight. Furthermore, the invention refers to a method for the production of these films.

For more than a hundred years, film-foils based on cellulose derivatives have been produced for use as support material for photoactive layers, as support material for membranes and in the last ten years also utilized as optically inert protective material for liquid crystal displays (LCD)-crystal layers and polarizing layers in LCD screens. Preferred materials to use are cellulose ester, such as for example triacetate cellulose (TAC), diacetate cellulose (DAC), cellulose acetobutyrate (CAB) of cellulose acetopropionate (CAP), or combinations of these cellulose derivatives.

Beginning roughly at 2000, films based on triacetate cellulose are also utilized as components of protective films, window films, sun glasses, ski goggles, protective glasses and special glasses. Normally, different films of varying thickness and functionality are glued together, wherein the typical assembly is as follows:
  hard coat layer (exterior)
  UV-400 protective layer
  TAC-layer, may be colored
  polarization filter (PVA-layer), may be colored
  hard coat layer (interior)

The TAC-films used for this purpose are produced in a comparatively complex casting process, which essentially is based on the process steps of dissolving, filtering, degassing, depositing and drying, where each producer has a specific and individually developed production process.

By adding certain additives the product properties can be changed or optimized, such as for example, UV-resistance, thermal resistance, expansion behavior, transmission, absorption behavior, blocking behavior etc., in accordance with the specifications requested by the client. Corresponding to those properties TAC-films as UV protection films, hardened films, colored films, retardation-film, PVA protective film, thermally resilient intermediate film, black and white-base film or colored base film are offered. For producing such end products as for example LCD-screens or sun protection glasses, gluing together of functionally different films is always required in order to obtain the best possible property profiles. The majority portion of the TAC-films that are produced worldwide is not utilized as a single layer for direct application to the end product, and with the exception of base films for photographic film, normally most are used for a multi layered assembly into an end product. Reason for that is on the one hand TAC-films having thicknesses above 300 µm cannot be produced easily of a quality required by market demand, or can be produced only in an inefficient manner, and on the other hand, the different optically functional properties of the end product can only be realized by a combination of single layers that are produced independent of each other.

Production of multifunctional sunlight-protection films based on cellulose acetate with required properties such as the highest possible transmission, low Haze-value ≤1%, 90-99% UV-blockage, permanent UV-resistance, defined color, excellent homogeneity of color- and UV-absorption distribution, mechanical and thermal stability, transport and storage stability, work-stable at temperatures ≥120° C. without negative impacts, saponification without negative Impact and the defined absorption retina-endangering and/or retinal cone-irritating light components, has not been realized to date.

To date, a defined property profile of TAC film could be so far realized only for about two to three additives. A combination of several additives and their properties impacting the film leads to uncontrolled negative interaction that give rise to problems in the films production or negatively impacts the quality of the film as well as the further material treatment process.

As an example of improving the mechanical properties (especially of expansion), the required addition of plasticizers and the addition of UV-light absorbing absorbers should be mentioned here. In order to realize processability desired by the end customer and the UV-light absorption at 400 nm of 99%, it is necessary to provide plasticizer portions of ca. 11 to 15%, as well as large amounts of UV absorbers to be brought Into the matrix such that already during production of the films, UV absorber discharge either occurs on the feed cylinder or In the subsequent saponification process at the laminate producer such that the UV absorbers that are insufficiently integrated into the TAC-matrix are expelled, which worsens the UV absorption of the final product.

At that time, any addition of color-changing- and other additives is then no longer possible so that further additives will have to be brought into the matrix through additional film layers. These single layers then differ in their optical and mechanical properties which finally negatively impacts transmission of the spectrally differentiated light diffraction behavior of the end product thereby confronting the producer with considerable problems. Due to overlay or reinforcement of production-dependent property tolerances of the single layers, such as for example, local thickness fluctuation can result locally in fluctuation of mechanical and optical parameters. Optical fluctuations in the end product which are hardly measurable, but quite visible with the eye by detecting inhomogeneities (strips, local lighter or darker changes, or spot-shaped changes etc.) are leading to reduced product quality and reduction in product readiness.

An object of the present invention is to reduce the use of the necessary different single layers in a multi-layer composite system, such as for example a laminate, with the aid of multi-functional cellulose ester-films, in order to improve the quality as well as the homogeneity of the optical and mechanical properties of the entire system.

In addition, it should be possible for producers of optical components, in particular in the area of sun glass lenses, to utilize multifunctional cellulose ester films also as single layer instead of a multilayer film composite, which normally would be composed of different functional layers, in which the functions of the several layers are combined in the one layer.

SUMMARY OF THE INVENTION

The present invention solves the objects by providing multifunctional optically highly transparent films according to independent claim 1, that are utilized as sunlight protective films. These are films based on cellulose esters that include the following components within one film:

a) cellulose ester or a mixture of cellulose esters, preferably based on cellulose triacetate which because of its high purity and optical quality can be made into a highly transparent film with a haze value ≤0.4% and defined by the following properties:
as raw material cotton-linters
a small portion, that is, less than 300 ppm, preferably ≤150 ppm of so-called birefringent particles having a size of less 20 μm,
a small portion of water, that is ≤1%
a small portion of gel-forming components, that is ≤0.5%,
a small amount of yellow color, characterized by a low Hazen-number (APHA value) ≤70, analyzed in a 16% solution of cellulose triacetate, dissolved in methyl chloride according to the method ASTM D-1209,
a small portion, that is ≤0.5% of foreign fibers and over-or under-derivatized particles of a size of less than 40 μm,
a low haze value, that is ≤0.4% unfiltered cellulose derivative that was prior dissolved in dichloromethane or acetone and drawn into a film;

b) at least an organic or inorganic material which acts a space holder between the molecule chains of the cellulose esters and confers an improved flexibility and elasticity of the films and acts as a plasticizer and provides during the film drying process an optimal removal of the residual solvent in the film.

c) at least three organic or inorganic materials with transmission-affecting absorption function in the wave length range of 300 nm to 2500 nm, which are also effective and synergistic as plasticizer equivalent in the sense of a space holder between the molecule chains of the cellulose ester matrix, and have a protective function for the human retina; wherein this function refers primarily to reducing the energy performance in specific, that is, physiologically relevant wave lengths ranges, such as UV range <440 nm or in the range relevant for detecting contrast, at 580 nm, and characterized through the transmission reduction of the light that penetrates the film. Due to the synergistic effect of the component C) with respect to component b), a defined connection exists among portions of the components relative to the film and relative to each other.

The term "highly transparent" within the scope of the present invention, is defined by a Haze-Value of ≤1.0%. The Haze-value was determined with a Haze measuring instrument "haze-guard plus (4725)" of BYK Gardner company according to the ASTM D 1003, D 1044 method. The stated particle sizes in the nanometer range were determined by the manufacturers aided by X-ray diffractometry and in the micrometer range by the filtration method via different filters each having a defined pore size, for example 20 μm, 10 μm or 5 μm.

The films according to the present invention have at least two effective absorptive functions within the light optical range based on cellulose esters. These films comprise the afore-stated synergistically effective and correlated components a-c) with each component having at least an equivalently effective functional property relative to the other components.

According to a preferred embodiment of the present invention the effective plasticizers selected according to b) are from the group of phosphoric acid esters, phthalic acid esters, acetic acid esters, citric acid esters, fatty acid esters, glycols, polyesters and/or adipic acid esters, wherein further substances of similar functionality can also be utilized. Preferably, these substances have a boiling point of greater than 60° C.

As phosphoric acid ester the following can be, for example utilized, triphenyl phosphate, biphenyldiphenyl phosphate, tricresyl phosphate, cresyl diphenyl phosphate, octyl diphenyl phosphate, ethyl hexyl diphenyl phosphate, isododecyl di phenyl phosphate, butylenebis-(diethylphosphate), ethylenebis-(diphenylphosphate), triethyl phosphate, Tri-n-butylphosphate, phenylenebis (diphenylphosphate), phenylenebis-(dibutyl-phosphate) and/or resorcinalbis(diphenylphosphate).

As phthalic acid ester, for example, the following can be selected diphenylphthalat, dimethoxyethylphthalate, dimethylphthalate, dioctylphthalate, dicyclohexylphthalate, dibenzylphthalate, benzylethylphthalate, butylbenzylphthalate, methylphtalylmethyl-glycolate, ethylphthalylethylglycolate, propylphthalyl-propylglycolate, butylphthalyl-butylglycolate and/or dicyclohexylterephathalate.

As acetic acid ester, including citic acid ester, fatty acid ester and adipic acid ester, the following are suitable, for example: sorbitolhexylpropionate, xylitolpentaacetate, trimethyltrimellitate, triethyltrimellitate, tributyltrimellitate, diethylenglykoldibenzoate, dipropylenglykoldibenzoate, triethylenglykolbis-(2-ethylhexanonate), tartrate, oleate, sebacate, acelate, ricinoleate, diphenylsuccinate, di-2-naphthyl-1,4-cyclohexyldicarboxylate, tricyclohexyltri-barbamate, tetra-3-methylphenyltetrahydrofuran-2,3,4,5-tetracarboxylate, tetra-butyl-1,2,3,4-cyclopentyltetracarboxylate, triphenyl-1,3,5-cyclohexyltricarboxylate, triphenylbenzyl-1,3,5-tetracarboxylate, triethylcitrate, acetyltrimethylcitrate, acetyltriethylcitrate, acetyltributylcitrate, dimethyladipate, dioctyladipate, dicyclohexyladipate, 2,2,4,4-tetramethylcyclobutan-1,3-dioldiacetate, 2,2-dimethyl-4,4-diethylcyclobutan-1,3-diol-diisobutyrate, 2,2,4,4-tetramethylcyclobutan-1,3-diol-di-n-decanonate, 2,2,4,4-dimethylcyclobutan-1,3-diolbis(2-ethyl-hexanonate), octylepoxytallate and/or 2,2,4-trimethyl-1,3-pentandiol-diiso-butyrate.

As glycol, preferred are glycerintriacetate (Triacetin), gylcerintriproprionate (triprionine), polyethylenglykol, triethylenglykolbis-(2-ethylhexanonate), diethylenglycoldibenzoate and/or dipropylenglycoldibenzoate.

As polyester, for example polyester succinate and/or polyester adipate can be utilized.

Further substances having a similar functionality that re suitable are for example campher, campher anhydride or butylbenzylsulfonamide.

As synergistically effective components according to c) preferably, substances with the following properties are utilized.

UV light absorbing substances,
IR light absorbing substances,
visible light absorbing substances,
light in the wave length range of 300 nm to 2500 nm absorbing or reflecting nano-scale substances having an average particle size of ≤200 nm, which impact the Haze-value only minimally, that is, of a ΔHaze of ≤0.05.

photochromic dyes
thermochromic dyes
luminescent dyes
stabilizing substances that are effective as anti-oxidative and do not affect the Haze-value, and
transparent adhesion promoters and cross-linking agents.

As synergistically effective components according to c), preferred substances are utilized that are either entirely soluble in the following solvents or are stably dispersible:
water,
acetic acid,
methanol, ethanol, propanol, butanol, hexanol,
chloroform, dichloromethane, trichloromethane, tetrachloromethane, trichloroethane,
acetone, methylethyl ketone
Dioxan, tetrahydrofuran
methoxypropanol, ethoxypropanol
benzol, toluol, xylol,
methyl acetate, ethylacetate, propylacetate, butylacetate, dimethylsulfoxide and/or
acetonitril, n-hexane, n-heptane.

As synergistically effective components according to c) preferably, an organic or inorganic dye or dyes of a natural or synthetic source, are utilized from one of the following dye classes:
nano-scale pigment dyes,
metal composite dyes,
laser dyes,
luminescent dyes,
photochromic dyes and thermochromic dyes,
anthrachinone-based dyes,
cyanin dyes,
perionone dyes and/or
azo dyes.

As nano-scale pigment dyes can be selected, for example quinacridone-pigments, subphthalocyanin-pigments and/or benzimidazolon pigments.

As metal complex dyes, copper phthalocyanins are especially suitable, such as chrome-complexes with 1-[[2hydroxy-4/5-nitrophenyl]-azo]-2-naphthaphenol, solvent brown 42, solvent black 27, solvent black 28, solvent black 29, solvent yellow 89, solvent orange 99 and/or solvent red 130.

Preferred laser dyes are rhodamine 6G, rhodamine 110, 7-hydroxy-4-methylcoumarin, 7-diethylamino-4-methylcoumarin, ethyl-7-diethylamino-coumarin-3-carboxylat, 5-(4-Dimethylaminobenzyliden)-rhodanine, 9-diethyl-aminobenzo[a]phenoxazon und/oder Bis(dithiobenzil)nickel.

As luminescent dyes the following are utilized, for example, 5(6)-carboxy-X-rhodamin, fluorescein, 3,3'-diethyloxacarbocyaniniodide, 2-ethylhexyl-α-cyano-5-phenyl-2,4-pentadienoate, ethyl-α-cyano-4-hydroxycinnamate, 1-(2-chloro-5-sulfo-phenyl)-3-methyl-4-(4-sulfophenyl)-azo-2-pyrazolin-5-on-dinatrium, 3-Allyl-5-(3-ethyl-4-methyl-2-thiazolinyliden)-rhodanine, N-(1-hexylheptyl)-perylen-3,4:9,10-tetracarbonsäure-3,4-anhydride-9,10-imide, N-(1-heptyloctyl)-perylen-3,4:9,10-tetracarbonsäure-3,4-anhydride-9,10-imide, 12-(hexylheptyl)-3,3-dimethyl-pyrimi-do-[2,1-a]-anthra-[2,1,9-def:6,5,10-d'e'f']-diisochinolin-6,11,13(2H,3H,4H,12H)-trion, isobutyl-4,10-dicyanoperylene-3,9-dicarboxylate, perylene-3,4,9,10-tetraacetic acid bis-(2',6'-diisopropylanilid) and/or 4,5-dimethyloxy-N-(2-ethylhexyl)-naphthalimide.

Suitable photochrome, or thermochrome dyes are among others: naphthopyrane, spiro(indolin)pyridobenzoxazine, spiro(indolin)-naphthoxazine, spiro(indolin)benzoxazine, such as for example, 2,2-diphenyl-5-hydroxymethyl-6-methyl-9-methoxy-2H-naphtho-[1,2-b]-pyran, 2,2-diphenyl-5-(2-ethoxy-2-oxoethoxycarbonyl)-8-methyl-2H-naphtho-[1,2-b]-pyran, 2,2-di-phenyl-4-methoxycarbonyl-5-(2-methylpropionyloxy)-2H-naphtho-[1,2-b]-pyran, 3-(4-methoxyphenyl)-3-(3-methyl-4-methoxyphenyl-13-hydroxyindeno-[2,1-f]-naphtho-[1,2-b]-pyran, 3,3-di-(4-methoxyphenyl)-13-hydroxy-13-methylindeno-[2,1-f]-naphtho-[1,2-b]-pyran, 3-(4-methoxyphenyl)-3-3,4-dimethoxyphenyl)-6,11-dimethyl-13,13-dipropylindeno-[2,1-f]-naphtho-[1,2-b]-pyran, trimethyl-1,3,3-indolino-2-spiro-2'-methyl-8'-coumarino-[7,8-b]-pyran, trimethyl-1,3,3-indolin-Z-spiro-2'-quinolino-[7,8-b]-pyran, trimethyl-1,3,3-indolin-2-spiro-2'-dimethyl-6',7'-chromono-[7,8-b]-pyran, 1,3-dihydro-6-N-[2-(octadecanoyl-oxy)-ethyl]-piperazino-1,3,3-trimethylspiro-[2H-indol-2,3'-[3H]-naphth-(2,1-b]-(1,4)-oxazin], 1,3-Dihydro-9'-(octadecyloxyacetat)-1,3,3-trimethylspiro-[2H-indol-2,3'-[3H]-naphth-[2,1-b]-(1,4)-oxazin], methyl-[phenylazothioformic acid-2-phenylhydrazidato]-mercury, 1,3,3-trimethyl-6'-nitrospiro-(2H-1-benzopyran-2,2'-indolin), 1,3,3-trimethyl-6'-nitro-8'-methoxyspiro-(2H-1-benzopyran-2,2'-indolin), 1,3,3-trimethyl-6'-nitro-8'-bromo-spiro-(2H-1-benzopyran-2,2'-indolin), 1,3-trimethyl-5-chloro-6'-nitrospiro-(2H-1-benzopyran-2,2'-indolin), 1,3,3-trimethylspiro-[2H-indol-2,3'-[3H]-pyrano[3H]-pyrano-[3,2-f-]quinolin, 5'-penta-methylspiro-2H-1,4-benzoxazin-2,2'-indolin], 2,3-dicarbomethoxy-8a-methylspiro-[1,5,6,8a-tetrahydropyrrolo-[1,2-a]-[3,4]-dihydroisoquinolin-1,9'-fluoren], 2,3-dicyano-8a-phenylspiro-[1,5,6,8a-tetrahydropyrrolo-[1,2-a]-[3,4]-dihydroisoquinolin-1,9'-fluoren], 2,3-dicarbomethoxyspiro-[1,2,3,8a-tetrahydropyrrolo-[1,2-a]-isoquinolin-1,9'-fluorene], E-α-(2,5-dimethyl-1-p-tolyl-3-pyrryl)-ethyliden-(isopropyliden)-succinic acid anhydride and/or E-α-(1,5-diphenyl-2-methyl-3-pyrryl)-ethyliden-(isopropyliden)-succinic acid anhydride.

Preferred anthrachinone-based dyes are known under the terms Solvent Red 111, Solvent Blue 97 and Solvent Violet 13.

As cyanin dyes, can be utilized, for example, 3,3'-diethylthiacyaninethylsulfate, 3,3'-bis-(3-sulfopropyl)-5,5'-dimethoxythiacyaninbetaintriethylammonium and/or 5,5'-dimethoxy-3,3',9-triethyloxacarbocyaninthiocyanate. Especially suitable as perionone dyes known under the names Solvent Red 179 and Solvent Red 135.

As azo dyes can be utilized, for example, 4-[(5-cyano-1-ethyl-5,6-dihydro-2-hydroxy-4-methyl-6-oxo-3-pyridinyl)-azo]-1,3-benzoldisulfonate, 4-phenylazodi-phenylamin and/or Solvent Yellow 14.

The synergistically effective single dyes of component c) exhibit the following properties:
at least one transmission minimum in the visual wave length range of 400 nm to 780 nm with a bandwidth of maximally 75 nm at 96% of the transmission minimal value,
a molecular weight of ≥200 g/mol,
a high long-term stability of the transmission properties in the end product, that is, the deviation of the transmission- and color values relative to the starting values can be maximally 10% If the storage or material stress conditions are as follows:
a relative air humidity of 50%
a temperature of 80° C.
a storage duration of 500 hrs;
a boiling point or disintegration point: ≥105° C. and
a transmission at 380 nm of ≤80%.

As synergistically effective components, preferably also organic or inorganic components can be utilized that exhibit at a wave length of 380 nm a transmission of ≤10% of the average transmission in the wave length range of 400 nm to 780 nm or, can also be assigned to one of the following substance classes:
- benzophenone,
- benzotriazole,
- acetic add ester,
- triazine or
- nano-scale metal oxide having an average particle size of ≤250 nm.

Suitable benzophenones are among others 2-hydroxybenzophenon, 2,2'-dihydroxy-4,4'-dimethoxybenzophenon, 2,1'-dihydroxy-4,4'-dimethoxybenzo-phenon, 2-hydroxy-4-methoxybenzophenon, 2-hydroxy-4-methoxy-5-sulfobenzophenon, 2-hydroxy-4-n-octoxy-benzophenon, 2,4-dihydroxybenzo-phenon und bis-(2-methoxy-4-hydroxy-5-benzophenylmethan).

As benzotriazole the following can be for example utilized: 2-(hydroxy-5'-methylphenyl)-benzotriazole, 2,2'-(dihydroxy-3',5'-di-tert-butylphenyl)-5-chlorobenzotriazole, 2-(2-hydroxy-5-tert-octylphenyl)-benzotriazole, 2-(2'-hydroxy-5'-methylphenyl)-benzotriazole, 2-(2'-Hydroxy-3'-(3",4",5",6"-tetrahydrophthalimidomethyl)-5'-methylphenyl)-benzotriazole and/or 2,2-methylenbis-(4-1,1,3,3-tetramethylbutyl)-6-(2H-benzotriazol-2-yl)-phenol.

Preferred acetic acids are for example, 4-tert-butylphenylsalicylate, phenylsalicylate, phenylresorcyate, p-octylphenylbenzoate, bis-(p-nonylphenyl)-isophthalate, bis-(p-nonylphenyl)-terephthalate, diethyl-p-methoxy-benzylidenmaleonate and diethyldiphenylmethylenmaleonate.

As triazine, the following can be for example utilized: hydroxy-3',5'-dimethylphenyl)-4,6-dimethyl-s-triazine, 2-(2'-hydroxy-4',5'-dimethylphenyl)-4,6-dimethyl-s-triazine, 2-(2'-hydroxy-5'-chlorophenyl)-4,6-dimethyl-s-triazine, 2-(2'-hydroxyphenyl)-4,6-dimethyl-s-triazine, 2-2'-hydroxy-5'-tert-butylphenyl)-4,6-dimethyl-s-triazine, 2-(2'-hydroxyphenyl)-4,6-didecyl-s-triazine, 2-2'-hydroxyphenyl)-4,6-bis-β-methyl-mercaptoethyl-s-triazine, 2-(2'-hydroxyphenyl)-4,6-bis-N-dimethylaminoethyl-s-triazine, 2-(2'-hydroxy-4'-methoxyphenyl)-4,6-diphenyl-s-triazin, 2-(2'-hydroxy-4'-isopropyl)-4,6-diphenyl-s-triazine, 2,4-bis-(2,4-dimethylphenyl)-6-(2-hydroxy-4-isooctylphenol)-1,3,5-triazine und/oder 2,4,6-tris-(2-hydroxy-4-octyloxyphenyl)-s-triazine.

Finally, suitable nano-scale metal oxides are zinc oxide, cerium oxide, titanium oxide as well as metal-complex based compounds such as for example [2,2"-thiobis-4-tert-octylphenolate)]-n-[butylamin-nickel(II).

In an advantageous embodiment of the present invention, synergistically effective components according to c) can be organic or inorganic substances which at a wave length of 800 nm±10 nm exhibit a transmission of ≤40% of the average transmission in the wave length range of 400 nm to 780 nm and can thus be utilized as an IR-absorber. Examples of corresponding nano-scale inorganic compounds are the following: lanthan hexaboride, samarium hexaboride, chrom (III)-oxide, copperoxide, titaniumdioxide, tin(IV)oxide, indiumoxide, wolframoxide, bariumwolframate, rubidiumwolframate as well as sodium wolframate.

Examples of correspondingly suitable organic compounds are:
2,11,20,29-tetra-tert-butyl-2,3-naphthalocyanin, vanadyl-2,11,20,29-tetra-tert-butyl-2,3-naphthalocyanin, 2,9,16,23-tetra-tert-butyl-29H,31H-phthalocyanin, Bis-(trihexylsiloxy)-silikon-2,3-naphthalocyanin, 5,9,14,18,23,27,32,36-octabut-oxy-2,3-naphthalocyanin, vanadyl-3,10,17,24-tetra-tert-butyl-1,8,15,22-tetrakis-(dimethylamino)-29H,31H-phthalocyanin, nickel(II)-[5,9,14,18,23,27,32,36-octa-butoxy-2,3-naphthalocyanin], dimethyl-[4-[1,7,7-tris-(4-dimethylaminophenyl)-2,4,6-heptatrienyliden]-2,5-cyclohexadien-1-yliden]-ammoniumperchlorat, 2-[2-[3-[(1,3-Dihydro-3,3-dimethyl-1-propyl-2H-indol-2-yliden)-ethyliden]-2-(phenyl-thio)-1-cyclohexen-1-yl]ethenyl]-3,3-dimethyl-1-propylindolium-perchlorate, 4,5:4',5'-dibenzo-1,1'-dibutyl-3,3,3',3'-tetramethylindatricarbo-cyaninhexafluoro-phosphate, 1,4,5,8-tetrakis(arylamino)anthraquinon, bis-arylen-dicarboximide)-a,d-1,5-diaminoanthraquinon, 4,4',4"-tris-(N,N-phenyl-3-methyl-phenylamino)-triphenylammoniumhexafluoroantimonate und N3,N3,N6,N6-tetrakis-[4-(dibutylamino)phenyl]-1,4-cyclohexadien-3,6-diaminiumhexafluoroantimonate (1:2).

According to a further preferred embodiment of the present invention synergistically effective components according to c) are organic or inorganic substances that after light exposure of a wave length (λ) exhibit 400 nm a reversible change of the transmission in the range of visible light and a reduction of the transmission in the range of UV light and thus a reduction of the radiation energy in the range of 300 nm to 780 nm, wherein the components exhibit the following property profile:
- a film thickness of 30 μm to 300 μm,
- a break stability of ≥95 N/mm$^2$,
- an expansion of ≥12%,
- an elasticity module of ≥2,500 N/mm$^2$,
- a temperature reliability with a stability to 150° C. without disintegration, melting or irreversible deformation,
- a high long term stability of optical properties, that is the level of Haze-values and the transmission values deviates maximally 10% from the starting value after storage of more than 500 hours at 80° C./50% relative humidity,
- a plasticizer content of ≤20 mass-%, wherein the portion of triphenylphosphate does not exceed 16 mass-%,
- an additive content of ≤5 mass-%
- a Haze-value of ≤0.75% with regard to 180 μm film thickness, a transmission prior to the impact of light of (Λ) ≤400 nm:
Transmission at 380 nm of ≥30%
Transmission at 400 nm of ≥50%
Transmission at 550 nm of ≥50%
a transmission after the impact of light of Λ 400 nm at an impact time of 300 s
transmission at 380 nm of ≤30%,
transmission at 400 nm of ≤50%,
transmission at 550 nm of ≤50%.

In addition, to the synergistic effective component according to c) and for improving the longterm- and temperature stability preferably stabilization agents such as antioxidants or HALS-compounds (Hindered Amines Light Stabilizers) are utilized.

These stabilization agents Include among others, but not exclusively: hindered phenols, such as for example 2,6-di-tert-butyl-4-methylphenol, 2,2'-methylenbis-(4-methyl-6-tert-butylphenol), n-octadecyl-3,5-di-tert-butyl-4-hydroxyphenyl)-propionate, n-octadecyl-3-(3,5-di-tert-butyl-4-hydroxybenzoate, n-hexyl-3,5-di-tert-butyl-4-hydroxyphenylbenzoate, ethyl-α-(4-hydroxy-3,5-di-tert-butylphenyl)-4-isobutyrate, octadecyl-4-hydroxy-3,5-tert-butylphenyl)isobutyrate, 2-n-octylthio)-ethyl-3,5-di-tert-butyl-4-hydroxy-benzoate, 2-n-octylthio)-ethyl-3,5-dibutyl-4-hydroxy-phenylacetate, diethylglycolbis-(3,5-di-tertbutyl-4-hydroxyphenyl)-propionate, stearylamido-N,N-bis-[ethylene-3-(3,5-di tert-butyl-4-hydroxyphenyl) propionate], n-butylimino-N,N-bis-[ethylene-3-(3,5-di-tert-butyl-4-hydroxyphenyl)-propionate], 2-(2-stearoyloxyethyl-thio)-ethyl-7-(3-methyl-5-tert-butyl-4 hydroxyphenyl)-heptanoate, 1,2-propylenglykolbis-[3-(3,5-di-tert-butyl-4-hydroxyphenyl-propionate], ethyleneglycolbis-[3-(3,5-di-tertbutyl-4-hydroxy-phenyl)-propionate], ethyleneglycolbis-(3,5-di-tert-butyl-4-hydroxyphenylacetat), glycerin-1-n-octadecanoat-2,3-bis-(3,5-di-tert-butyl-4-hydroxyphenylacetat), sorbitolhexa-[3-(3,5-di-tert-buty-4-hydroxyphenyl)-propionate], 1,6-n-hexandiol-bis-[(3',5'-tert-butyl-4-hydroxyphenyl)-propionate], pentaerythritoltetrakis-(3,5-di-tert butyl-4-hydroxyhydrocinnamat);

HALS-compounds, such as for example N-(2-ethoxyphenyl)-N-(4-isododecylphenyl)-ethandiamide, bis-(1,2,2,6,6-pentamethyl-4-piperdinyl)-[3,5-bis-(1,1-dimethylethyl-4-hydroxyphenyl)-methyl]-butylpropandioate, bis-(2,2,6,6-tetramethyl-4-piperdinyl)-decandioate, 1-acetyl-4-(3-dodecyl-2,5-dioxo-1-pyrrolidinyl)-2,2,6,6-tetramethylpiperidin, SANDUVOR 3051/3052/3055/3056, 4-hydroxy-2,2,6,6-tetramethylpiperidin, 1-allyl-4-hydroxy-2,2,6,6-tetramethylpiperidin, 1-benzyl-4-hydroxy-2,2,6,6-tetramethylpiperidin, 4-stearoyloxy-2,2,6,6-tetramethylpiperidin, 1-benzyl-2,2,6,6-tetramethyl-4-pyperidinylmaleinat, (di-2,2,6,6-tetramethylpiperidin-4-yl)-adipate, trimellitsäure-tri-(2,2,6,6-tetramethylpiperidin-4-yl)-ester, 1-acryloyl-4-benzyloxy-2,2,6,6-tetramethylpiperidin, tris-(1-propyl-2,2,6,6-tetramethylpiperidin-4-yl)-phosphate, N,N'-bis-(2,2,6,6-tetramethylpiperdin-4-yl)-hexamethylen-1,6-diamine, 1-acetyl-4-(N-cyclohexylacetamido)-2,2,6,6-tetramethylpiperidin, 4-methacrylamido-1,2,2,6,6-pentaethylpiperidin, bis-(2,2,6,6-pentamethyl-4-piperidenyl)-sebacate, bis-(1,2,2,6,6-pentamethyl-4-piperdinyl)-sebacate, methyl-(1,2,2,6,6-pentamethyl-4-piperdinyl)-sebacate, N-β-hydroxyethyl-2,2,6,6-tetramethyl-4-hydroxypiperidin;

Polyphenols, such as for example tetrakis-[methylene-(3,5-di-tert-butyl-4-hydroxyhydrocinnamat)]-methan, 1,3,5-trimethyl-2,4,6-tris-(3,5-di-tert-butyl-4'-hydroxybenzyl) benzene, 1,3,5-tris-(3,5-di-tert-butyl-4'-hydroxybenzyl)-isocyanurate, 3,5-di-tert-butyl-4-hydroxyhydrocinnamat-triester with 1,3,5-tris-(2-hydroxyethyl)-triazin-2,4,6-(1H,3H,5H)-trion, 1,3,5-tris-(4-tert-butyl-3-hydroxy-2,6-dimethylbenzyl)-triazin-2,4,6-(1H,3H,5H)-trion;

Formamidine: N'-(4-ethoxycarbonylphenyl)-N-methyl-N-phenylformamidine, N,N'-bis-(4-ethoxycarbonylphenyl)-N-methylformamidine, N-(4-dimethylaminophenyl)-N'-(4-ethoxy-carbonylphenyl)-N-methylformamidine, N'-(3-hydroxy-4-methoxycarbonylphenyl)-N-methyl-N-phenylformamidine, N-butyl-N-phenyl-N'-(4-ethoxycarbonylphenyl)-formamidine, N'-(4-Isopropoxycarbonylphenyl)-N-methyl-N-phenylformamidine, N'-2-chloro-4-methoxycarbonylphenyl)-N-methyl-N-phenylformamidine and/or epoxidized compounds, such as for example butylepoxystearate, epoxidized soybean oil, epoxidized linseed oil, epoxidized rape oil, epoxymethyloleate, epoxybutyloleate, bisphenol-A-diglycidether, bisphenol-F-diglycidether, glicydilylacrylate, glycidiylmethacrylate, EPON Resin 815, epoxidized polybutadiene.

According to an especially preferred embodiment of the present invention the components a) to c) are combined such that a multifunctionality is already realized in a single layer which is defined by the following profile of properties:

a film thickness of 30 μm to 300 μm,
a break stability of ≥95 N/mm$^2$,
stretching of ≥12%
an elasticity module of ≥2.500 N/mm$^2$,
a temperature stability to 150° C. without degradation, melting or irreversible deformation,
high long term stability of the optical properties, that is, the level of Haze-values and transmission values deviate maximally 10% from the starting value after storage of more than 500 hrs at 80° C./50% relative humidity,
a plasticizer content of ≤13 mass %,
an additive content of ≤5 mass %
a Haze-value ≤0.75%, relative to 180 μm film thickness,
a transmission at 400 nm: ≤50% and
color values according to CIE-Lab 1976; 10°; D 65:
L: 30 to 80,
a: −100 to +100,
b: −150 to +150.

The components a) to c) are preferably combined in such a way so as to result in an improved protection of the retina and reduction of stress on the eye by the absorption of UV-light and also by absorption of light in the visible range at a wave length of 580 nm and/or 490 nm and/or 435 nm, wherein the films exhibit the following properties:

a film thickness of 70 μm to 270 μm,
a break stability of ≥95 N/mm$^2$,
expansion of ≥12%
an elasticity module of ≥2.500 N/mm$^2$,
a temperature stability to 150° C. without degradation, melting or irreversible deformation,
high longterm stability of the optical properties, that is, the level of Haze-values and transmission values deviate maximally 10% from the starting value after storage of more than 500 hrs at 80° C./50% relative humidity,
a plasticizer content of ≤13 mass %,
an additive content of ≤5 mass %
a Haze-value ≤0.75%, relative to 180 μm film thickness,
a transmission at 400 nm of ≤50%,
a transmission at 435 nm of ≤70% of transmission value measured at a wave length of 450 nm,
a transmission at 490 nm of ≤70% of transmission value measured at a wave length of 525 nm,
a transmission at 580 nm of ≤70% of transmission value measured at a wave length of 550 nm,
a transmission at 650 nm of 20%.

Further embodiments of this variant, while retaining the properties of the film, include a combination of UV-absorbers and color dyes which absorb light only at a wave length of 580 nm and/or a wave length of 490 nm and thus contribute to the stress reduction on the eye. Hereby the following transmission values apply:

a transmission at 400 nm of ≤50%,
a transmission at 490 nm of ≤70% of the transmission value, measured at a wave length of 525 nm, provided a synergistically effective color dye having an absorption maximum at 490 nm is present and/or
a transmission at 580 nm of ≤70% of the transmission value measured at a wave length of 550 nm provided a synergistically effective color dye having an absorption maximum at 580 nm is present,
eine Transmission bei 650 nm von ≥20%.

In a further embodiment, the components a) to c) preferably are combined in such a way that it results in an Improved protection of the retina and considerable stress reduction on the eye, especially through absorption of UV-light and the absorption of light in the visual blue range at a wave length of 435 nm, wherein the films have the following profile properties:
- a film thickness of 70 μm to 270 μm,
- a break stability of ≥95 N/mm²,
- stretching of ≥12%,
- an elasticity module of ≥2.500 N/mm²,
- a temperature stability to 150° C. without degradation, melting or irreversible deformation,
- a high longterm stability of optical properties at 500 hours at 80° C./50% relative humidity,
- a plasticizer content of ≤13 mass-%,
- an additive content of ≤5 mass-%,
- a Haze-value of ≤0.75%, relative to a 180 μm film thickness,
- a transmission at 380 nm of ≤5%,
- a transmission at 400 nm of ≤15%,
- a transmission at 435 nm of ≤70% of the transmission value, measured at a wavelength of 450 nm.

In an especially preferred embodiment, component a) to c) are advantageously combined in order to realize improved protection of the retina in the UV range and a great reduction of stress on the eye at high light Intensity impact through absorption of UV light as well as absorption of light in the visible range at a wave length of 435 nm and/or 490 nm and/or 580 nm, wherein through utilizing photochromatic dyes, the reduction of transmission becomes reversible, such that when UV-light impact is canceled the film brightens without reducing the effect of improved contrast that imparts stress relief on the retina.

The manufacture of cellulose ester films generally requires a possibly homogenous derivatized starting material, such as for example cellulose diacetate or cellulose triacetate dissolved in an organic solvent of solvent mixture together with the necessary additives such as plasticizers, stabilizers or dyes to Include into the material and subsequently to purify the resulting pourable medium- to highly-viscous solution through filtration and degassing and casting it into a film. A similar manufacturing process is for example described in the following patents U.S. Pat. No. 3,547,668 A, EP 0708135 BI, U.S. Pat. Nos. 3,489,584 A and 5,152,947 A.

A film according to the present invention which is multifunctional and optically highly transparent can be produced with a method in which cellulose ester of the mixture of cellulose esters according to a) is present as a starting material with subsequent addition of components b) and c) as additives. Within the scope of producing high quality cellulose ester-films for subsequent use in LCD monitor area, basically only raw materials with very few contaminants and a low acid content are utilized.

Within the scope of the preliminary investigations to produce improved cellulose ester films, it was surprisingly found that utilization of the afore-stated high quality cellulose ester and combination synergistically effective additives, a markedly improved optical quality and expanded functionality of the film is realized. This is obviously due to the production and processing methods of the raw material producer producing a cellulose matrix with more free sites between the molecule chains are available that can then be occupied by the respective additives.

In further investigations, it was shown that for the production of multifunctional cellulose ester films cellulose esters as starting raw material is to be utilized which have the afore-stated parameters under a).

According to an especially preferred embodiment of the films of the present invention, a cellulose ester material of especially high purity is utilized which was previously dissolved in at least one solvent from the group of halogen organic solvents, alcoholic solvents, acetic acid esters, aromatic solvents, ether or ketones, and almost completely dissolved, homogenized and freed from undissolved, unwanted particles such as gel-, fiber-, and undissolved raw material particles in a multistep filtration process before the addition of afore-stated functional components b) and c).

It has been found to be especially advantageous if the cellulose material is preferably cellulose triacetate with the afore-stated profile, is further purified by a multi-step processing and filtration steps in order the rid the starting matrix of foreign material in the intermolecular—as well as in the macroscopic area. This process might considerably exceed the normal production method for cellulose ester film and can also include an ultrafine filtration step wherein filter material with a filter size of ≤5 μm or in exceptional cases also ≤2 μm are used.

The scope of the processing includes also a multi-step dissolution of the raw material or purification of the raw material in varying organic solvents or combination of solvents, such as for example methylacetate, ethylacetate, butyl acetate, chloroform, dichloromethane, trichloromethane, acetone, methylethylketone, butanol, propanol, ethanol, methanol.

Adding each of the required additives should follow preferably during the dissolution process or during a subsequent dilution process, wherein it was also surprisingly found that the sequence of adding the components plays an important role in the later product properties and that the synergistic as well as the divergent interaction of the additives amongst each other and also with reference to the Integration into the matrix have to be taken into account.

Functional additives as afore-stated are plasticizers, UV- or IR absorbers, dyes, structure-changing foreign polymers, antiblock-agents, cross-linking agents, stabilizers, acid blockers, radical catchers and water and further organic or inorganic substances added that are suitable for the respective application.

An important feature of the additives to be added is the solubility, or the stable dispersibility in each of the afore-stated solvents or their mixture.

A basic idea of the present invention is the exchange of certain portions of an additive with one or more synergistically effective additives with similar functional efficacy and additional functional properties.

According to an advantageous embodiment of the process, the components that are effective as plasticizers and/or synergistic plasticizer equivalents b) and c) are added to the product solution, at least partially, only after filtration and are subsequently in the product solution homogenized; wherein the portion of the components acting as plasticizers, and with regard to the molecule chains of the cellulose ester act as distance holders, is in total less or equal to 25% and the portion of the plasticizer components according to b) less or equal to 20%.

According to an especially preferred embodiment of the method, the portion of components that are added to the product solution as effective plasticizers is less than 16%, wherein the portion of the effective component that is synergistically effective as plasticizer and distance holder according to c) at least 1.2 mass-%, relative to the entire mass of the component that is effective as softener and distance holder according to b) and c). In other words, the normally used plasticizer component according to b) is partially replaced by a synergistically effective plasticizer and distance holder component according to c). Surprisingly, causing substantial changes, that is, the exchange leads to ≤3% change of mechanical properties of the film as compared to a film without the partial replacement of the plasticizers component b).

For example, 5% of the plasticizer is replaced by UV-light absorbing substrates and suitable organic dyes, that aside from the light absorbing functionality, also include the feature of a plasticizer. The so produced films, at almost identical mechanical properties, also have a defined UV-absorption and filter effect in the visible range.

When adding dye components during the dissolving process, instead of adding the reduced portion of plasticizer, the additives are optimally integrated into the film matrix. In another variant, it is possible to dissolve the additive components in the plasticizer or dissolve them together with the plasticizer and subsequently to add to the already prepared cellulose triacetate solution. Combinations of these variants are also possible in order to realize the best possible homogenization and even distribution of the so added additives.

As compared to the conventional production methods, for the novel multifunctional films, the production process is directed to a synergistic combination of all additives in order to realize an optimized, that is, a minimized amount of each of the additives in combination with all other necessary additives necessary for the property profile of the end product.

Dyes are also utilized in accordance with their properties as plasticizer components and plasticizers and also relative to their light- or UV absorbing effect Combination of dyes with UV-Absorber functionality and dyes with thermochromic or photochromic functionality which also exhibit an IR-absorbing effect, are also contemplated.

The novelty of the multifunctional cellulose ester films, according to the present invention resides in the fact that starting with the selection of type of raw material- and processing, as well as the selection of each of the additive components to be utilized in a complex method after extensive testing of the multifunctionality of each component, how they combine and the necessary sequence of addition in order to realize an optimal distribution in the starting matrix without negatively Impacting the mechanical and optical properties.

The group of plasticizers for example can include the following materials: organic materials from the group of phosphoric acid ester, phthalic acid ester, acetic acid ester, citric acid ester, fatty acid ester, glycols, polyester, adipin acid ester and further substances preferably with a boiling point greater than 60° C.

As UV-absorbers, organic or inorganic substances can be used that exhibit a transmission of ≤10% at a wave length of 380 nm of an average transmission in a wave length of 400 nm to 780 nm. Suitable substances of the following groups are as follows: benzophenone, benzotriazole, salicate, triasine, acrylate or also nanoscale metal oxides with an average particle size of ≤250 nm or also metal complexes.

The afore-stated and described organic or inorganic dyes have advantageously at least three, preferably five of the following properties:
an organic or inorganic dye of natural or synthetic sources, for example from one of the following dyes groups: metal complex dyes, nano-scale pigment dyes, laser dyes, luminescence dyes, perylene dyes, naphtalamid dyes, photochrome dyes, thermochrome dyes, other functional dyes;
at least one transmission minimum in the visible wave length range of 400 nm to 750 nm with a band width of maximal 75 nm at 95% of the transmission minimum value:
a molecular weight of ≥200 g/mol;
complete solubility of dispersibility in at least one of the following solvents: water, glacial acetic add, methanol, ethanol, propanol, butanol, hexanol, chloroform, dichloroform, dichloromethane, trichloromethane, tetrachloro methane, acetone, methyethylketone, dioxan, tetrahydrofuran, methoxypropanol, ethoxy propanole, benzol, toluol, xylol, methylacetate, ethylacetate, propylacetate, butylacetate, dimethylsulfoxide, acetonitril, n-hexane, n-heptane, thrichloroethane;
stability of transmission properties in the end product at least at 95% of the starting material at storing under the following conditions:
a relative air humidity: 50%
a temperature: 80° C. and,
a storage time: 500 hours;
a boiling point or degradation point of ≥105° C. and
a transmission at 380 nm of ≤80%.

Further additives can be: wetting agents, nanoscale antiblock agents with an average particle size of ≤250 nm and a maximal particle size of ≤1 µm, antioxidation agents, radical catchers, flame retardant, purest water and other functional substances.

In this manner, films are producible in the range of thickness of 30 µm to 300 µm exhibiting the following properties:
a break stability of ≥95 N/mm²,
a stretching of ≥12%,
an E-module of ≥2.500 N/mm²,
a temperature stability depending on the embodiment to 200° C.
a plasticizer content of ≤20 mass-%,
a Haze-value of ≤0.5%, preferably ≤0.3%,
a transmission at 380 nm of 0.1% to 92%,
a transmission at 400 nm of 0.1% to 92%,
a transmission at 435 nm of 1% to 92%
a transmission at 490 nm of 1% to 92%
a transmission at 550 nm of 1% to 92%
a transmission at 580 nm of 1% to 92%
a transmission at 800 nm of 5% to 92% and
a transmission at 550 nm after impact of UVA or UVB-light of 20% to 92%.

A preferred embodiment refers to multifunctional long-term stable color films having UV-absorbing function and a filtering ability in the retina-jeopardizing blue spectral range at 435 nm and a filter effect at 490 nm and 580 nm which is a range of retinal cone irritation or colorsensitivity transition with the following properties:
a film thickness of 70 µm to 220 µm,
a break stability of ≥95 N/mm⁼,
a expansion of ≥12%,
an elasticity module of ≥2.500 N/mm²,
a temperature stability to 150° C.
a plasticizer content of ≤15 mass-%,
a Haze-value of ≤0.7%,
a transmission at 400 nm of 1% to 50%,
a transmission at 435 nm of ≤70% of the transmission value measured at a wave length of 450 nm,
a transmission at 490 nm of ≤70% of the transmission value measured at a wave length of 525 nm,
a transmission at 580 nm of ≤70% of the transmission value measured at a wave length of 550 nm,
a transmission at 650 nm of ≥20%.

Optionally, films of this embodiment can extend their utility with an IR-absorbing color component and/or a photochromic color component without losing one of the afore-stated properties.

The multifunctional films of the present invention provide to the ultimate end user a series of economical ecological and qualitative advantages. As the films are very homogeneous in their property profile, they can be easily combined within their further processing for example into laminates for protective visors, sun glasses, window films etc. without impediments at the glue sites that could lead to light refraction effects, light diffraction or optically impeding inhomogeneities through tolerance addition. The Haze-value of the so-produced film composite products can be markedly reduced as compared to the combination of film layers of varying functionality. By reducing the necessary amount of additive due to the synergistic effect of each additive, a reduction in the amount of raw material and production cost is realized that is ecologically viewed as an advantage and conserves resources. For example, instead of the normally utilized combination of a 200 μm UV-400 absorberfilm, a 180 μm color film and two layers of a NON-UV-80-protective film having a total thickness of 540 μm, using a layer of a multifunctional 180 μm UV-color film, a further layer of a 80 μm UV-color film and two layers of a multifunctional 80 μm color filter film with a reduced total thickness of 420 μm is a combination with properties that are not negatively Impacted. Also contemplated is the reduction of the number of single layers from four to three through use of two layers, with each one of a 180 μm thick multifunctional UV-color film and a layer of 180 μm multifunctional Non-UV-color film with identical color values. The total thickness would still be at 540 μm, wherein the gluing step can fall away due to the reduction of the number of single layers. Such synergistic combination of the single components produces multifunctional films which, at already reduced thickness of layers, exhibit good UV absorption with simultaneous filtration of annoying light components and make for example, in a single layer in combination with a photochrome function and an IR-absorbing function, very good protective films for windows, doors, automobile glass, sun glasses, ski goggles and displays. The end product can thus have a reduced total thickness or reduction in weight.

Further details, features and advantageous embodiments of the present invention are shown from the following description of embodiments with reference to the respective drawings: It is shown in:

FIG. 1: transmission spectrum of a multifunctional color film with UV-380 nm-filter function and several absorption maxima.

EXAMPLE A

Multifunctional Color-Film with UV-380 nm Filter Function and Several Absorption Maxima.

DETAILED DESCRIPTION OF PREFERRED EMBODIMENTS

A film, comprising a cellulose triacetate at a possibly lowest Haze-value <0.4%, a plasticizer (triphenyl phosphate) in a concentration of less than 9% relative to the solid material and functional additives, is produced as follows:
dissolving the solid material in a solvent mixture of 93% dichloromethane and 7% methanol and stirring for at least 12 hours to realize a possibly highest homogeneity degree;
four step filtration of the solution up to a filter mesh width of minimally 2.5 μm;
successive addition of the UV stabilizers, for example 0.53% tinuvin 328, of the functional color component, for example, 0.11% (5(6)-carboxy fluorescein of Sigma Aldrich and 0.055% PTCDI of the firm Organica Feinschemie (D-06766 Bitterfeld-Wolfen), into the finest filtered product solution wherein a period between the addition steps of a homogenizing duration is minimally 15 minutes.
addition of the required amount of plasticizer, for example triphenylphosphate, in this case of 8.53% for dissolution and homogenizing during a further 4 hour period.
renewed multistep filtration of the solution, subsequent ultra sound degassing and placing the solution onto a circulating stainless steel band by means of a casting tool and
drying of the film leaving the casting tool still moist from the solvent is in a multi step dryer at a temperature of maximally 150° C. until to reach the required residual moisture and then coiled.

The so produced multifunctional color film with a filter effect at a wave length of 380 nm and several absorption maxima has the following properties:
basic color pink-violet coloration,
Haze-value: <0.5%,
film thickness: 80 μm (±5 μm),
break stability: >95 N/mm$^2$,
temperature stability of the film: up to 150° C.,
plasticizer content: 8 mass-%,
transmission values, see Table 1:

TABLE 1

|  | 80 μm Color Film with UV 380 nm-Filter Example A |
| --- | --- |
| T380 % | 28.8% |
| T460 % | 71.2% |
| T582 % | 62.4% |
| L* | 88,533 |
| a* | 5.0 |
| b* | −0.9 |
| T(lum) % | 72.9% | and transmission spectrum, which shows the transmission in [%] at a specific wave length in [nm], see FIG. 1.

EXAMPLE B

Multifunctional UV-Color Film with Photochrome Functionality

A film consisting of a cellulose acetate with lowest possible Haze-value, that is of ≤0.4%; a plasticizer in the form of triphenyl phosphate in a concentration of ≤12%, relative to the solid material, and a functional additive is produced by the following steps:
dissolving the solid material in a solvent mixture of 95% dicloromethane and 5% methanol and stirring at least for 12 hours to attain a highest possible homogenization;
four-step filtration of the solution up to a filter mesh width of 2.5 μm;
successively adding the UV-additive color stabilizers, for example benzophenone and timuvin, the dye components, for example Orasol®-dyes of the company Kremer Pigments, inclusive of a photochrome dye, for example Reversacoal-dye of the company James Robinson, Into an amount of methanol which corresponds to 5% of the total amount of solvent, maximally to realize a concentration, which corresponds to 95% of the total saturation concentration of the additives in the solution, optionally also heating the solution up to maximally 60° C.;

stirring the additive solution into the cellulose derivative solution and homogenization for approximately 4 hours;

addition of the required amount of plasticizers, for example triphenyl phosphate, in this case 12% to the solution and homogenizing for a further 4 hours;

renewed multistep filtration of the solution, subsequently ultra sound degassing and emergence of the solution onto a circulating stainless steel band by means of a casting tool and drying the still solvent-moist film emerging from the casting tool in a multi-step dryer to attain the required residual solvent moisture at a temperature of maximally 150° C. and coiling the film.

The so-produced multifunctional photochrome color film with UV protection exhibit the following properties:
basic color: grey-blue,
Haze-value: ≤0.3%
film thickness: 180 μm±5 μm,
break stability: ≥95 N/mm$^2$,
expansion: ≥14%,
elasticity module: ≥2.500 N/mm$^2$,
temperature stability of the film: up to 150° C.,
plasticizer content 12 mass % and
transmission values, see Table 2:

TABLE 2

| | 180 μm Photochrome Color Film with UV-Protection | |
|---|---|---|
| | inactive | after UV-activation |
| % T380 | ≤10% | ≤10% |
| % T490 | 18.3 | 12.1 |
| % T550 | 50.0 | 33.2 |
| % T584 | 15.7 | 9.0 |
| L* | 71.6 | 64.3 |
| a* | −0.7 | 3.0 |
| b* | −7.4 | −9.1 |
| $t_{1/2}$ | | 51 s |
| $t_{1/4}$ | | 158 s |

EXAMPLE C

Multifunctional Color Film with UV-Protection and Retinal Cone Relief Function

A film consisting of a cellulose triacetate with the lowest possible

Haze-value ≤0.4%, a plasticizer (triphenylphosphate) In a concentration of ≤9%, relative to the solid material, and functional additives is produced as follows:

dissolving the solid material in a solvent mixture of 93% dichloromethane and 7% methanol and stirring for at least 12 hours to attain a highest possible degree of homogenization; four-step filtration of the solution up to a filter mesh width of minimally 2.5 μm:

successive addition of the UV-stabilizers, for example Tinuvin 770 and Tinuvin 328, then the functional color components from the group of metal complex dyes (for example Orasol®-dyes of the company Kremer Pigment (D-88317 Aichstetten), the group of luminescence dyes (for example (5(6)-Carboxyfluorescine of the company Sigma Aldrich Laborchemikalien GmbH, D-30926 Seelze) and the group of perylene dyes (for example PTCDI of the company Organica Feinchemie D-Bitterfeld-Wolfen) into the finest filtered product solution, wherein between the addition steps, a homogenization duration should be minimally 15 min.;

addition of the required amount of plasticizer, for example triphenyl phosphate, in this case 8.5%, to the solution and homogenization of further 4 hours;

renewed multistep filtration of the solution, subsequently ultra sound degassing and outputting the solution onto a circulating stainless steel band by means of a casting tool and drying the still solvent-moist film emerging from the casting tool in a multi-step dryer to attain the required residual solvent moisture at a temperature of maximally 150° C. and coiling the film.

The so-produced multifunctional color films with UV protection exhibit the following properties:
basic color: dark grey with very little pink-violet coloration,
Haze-value: ≤0.5%
film thickness: 160 μm±5 μm,
break stability: ≥95 N/mm$^2$,
stretching: ≥14%,
elasticity module: ≥2.500 N/mm$^2$,
temperature stability of the film: up to 150° C.,
plasticizer content: 8 mass % and
transmission values, see Table 3:

TABLE 3

| | 160 μm Color Film with UV-Filter Example C |
|---|---|
| T380 % | ≤1% |
| T490 % | 6.0% |
| T580 % | 3.4% |
| L* | 48.95 |
| a* | 4.35 |
| b* | −0.75 |
| T(lum) % | 17.5% |

The invention claimed is:

1. A multifunctional highly transparent film based on cellulose esters comprising:
   a) a cellulose triacetate or a mixture of cellulose triacetates derived from cotton linters forming a cellulose matrix, ≤300 ppm of birefringent particles with a size of ≤20 μm,
   ≤1% water,
   ≤300 ppm free acetic acid,
   ≤0,5% of gel forming components,
   a yellow coloration characterized by a Hazen-color APHA value ≤70, analyzed in a 16% solution of cellulose triacetate, dissolved in methyl chloride according to the method ASTM D-1209,
   ≤0,5% of foreign fibers, and cellulose derivatized particles of a size of ≤40 μm,
   b) an organic or inorganic substance which act as a distance holder between molecule chains of the cellulose ester and any residual solvents and acting as an agent for synergistically integrating additional additives into the matrix;
   c) at least three organic or inorganic light transmission reducing substances to reduce light that penetrate a film in the wave length range of 300 nm to 2500 nm, said substances acting as a plasticizer and as a distance holder between the molecule chains of the cellulose matrix, wherein the cellulose derivatized particles were dissolved in chloromethane or acetone and stretched into the film having a Haze value of ≤0.4%.

2. The multifunctional highly transparent film of claim 1, wherein b) is selected from the group consisting of phosphoric acid ester, phthalic acid ester, acetic acid ester, citric acid ester, fatty acid ester, and glycols.

3. The multifunctional highly transparent film of claim 1, wherein the components of c) influence the haze-value with Δhaze of ≤0.1.

4. The multifunctional highly transparent film of claim 1, wherein the synergistically effective components of c) are compounds soluble or dispersible in one or more solvents of the group consisting of water, glacial acetic acid, methanol, ethanol, propanol, butanol, hexanol, chloroform, dichloromethane, dichloromethane, tetrachloromethane, trichloroethane, acetone, methylethylketone, dioxane, tertrahydrofuran, methoxypropanol, ethoxypropanol, benzene, toluene, xylol, methylacetate, ethylacetate, propylacetate, butylacetate, dimethylsulfoxide, acetonitril, n-hexane and n-heptane.

5. The multifunctional highly transparent film of claim 1, wherein the synergistically effective components of c) are one or more dyes selected from the group consisting of, metal complex dyes, laser dyes, luminescence dyes, photochromic dyes and thermochromic dyes.

6. The multifunctional highly transparent film of claim 5, wherein the synergistically effective dye of component c) has the following properties:
at least one transmission minimum in the visible wave length range of 400 nm to 780 nm with a bandwidth of maximally 75 nm at 95% of a transmission minimum value,
a molecular weight of 200 g/mol,
a boiling point or degradation point: ≥105° C. and
a transmission at 380 nm of less than or equal to 80%.

7. The multifunctional highly transparent film of claim 1, wherein c) are substances selected from the group consisting of benzophenone, benzotriazole acetic acid ester, triazine and a nano-scale metal oxide with an average particle size of 250 nm.

8. The multifunctional highly transparent film of claim 1, wherein c) are substances with a wave length transmission of ≤10% of the average transmission in the wave length range of 400 nm to 780 nm.

9. The multifunctional highly transparent film of claim 1, wherein based on light impact of wave length (Λ) ≤400 nm, the film shows a reversible change of transmission in the range of visible light, wherein the film exhibits the following properties:
a film thickness of 30 μm to 300 μm,
a break stability of ≥95 N/mm²,
stretching of ≥12%,
an elasticity modulus of ≥2500 N/mm²,
a temperature stability to 150° C. without degradation, melting or irreversible deformation,
wherein haze- and transmission values deviate maximally 10% from the starting value after storage of more than 500 hrs. at 80° C. at 50% relative humidity,
a plasticizer content of ≤20 mass %, wherein a portion of tri-phenyl phosphate does not exceed the value of 16 mass-% an additive content of ≤5 mass %
a transmission prior to the impact of light λ, at: ≤400 nm at an impact time,
transmission at 550 nm: ≤50%
a transmission after the impact of light λ, at: ≤400 nm at an impact time of 300 s,
transmission at 380 nm: ≤30%,
to transmission at 400 nm ≤50% and
transmission at 550 nm: ≤50%.

10. The multifunctional highly transparent film of claim 1, wherein the components a) to c) are combined such that a multi functionality is realized in a single layer and defined by the following properties:
a film thickness of 30 μm to 300 μm,
a break stability of ≥95 N/mm²,
stretching of ≥12%
an elasticity modulus of ≥2500 N/mm²,
a temperature stability to 150° C. without degradation, melting or irreversible deformation,
at 50% relative humidity wherein the haze- and transmission values deviate maximally 10% from the starting value after storage of more than 500 hrs. at 80° C. at 50% relative humidity,
a plasticizer content of ≤13 mass %,
an additive content of ≤5 mass %
a transmission at 400 nm of ≤50% and,
color value according to CIE-Lab 1976; 10°; D 65:
L: 30 to 80
a: −100 to +100,
b: −150 to +150.

11. The multifunctional highly transparent film of claim 1, wherein the film absorbs light at a wave length of 580 nm and/or 490 nm and/or 435 nm, and wherein the film has the following property profile:
a film thickness of 70 μm to 270 μm,
a break stability of ≥95 N/mm²,
stretching of ≥12%
an elasticity modulus of ≥2500 N/mm²,
a temperature stability to 150° C. without degradation, melting or irreversible deformation,
wherein the haze- and transmission values deviate maximally 10% from the starting value after storage of more than 500 hrs. at 80° C. at 50% relative humidity,
a plasticizer content of ≤13 mass %,
an additive content of ≤5 mass %
a transmission at 400 nm of ≤50% and,
a transmission at 435 nm of ≤70% of the transmission value measured at a wave length of 450 nm,
a transmission at 490 nm of ≤70% of the transmission value measured at a wave length of 525 nm,
a transmission at 580 nm of ≤70% of the transmission value measured at a wave length of 550 nm, and
a transmission at 650 nm of ≥20%.

12. A method for the production of the multifunctional optically highly transparent film according to claim 1, comprising the following steps,
providing the cellulose esters or the mixture of cellulose esters" to providing the cellulose triacetate or the mixture of cellulose triacetates according to a) as starting material,
dissolving the cellulose triacetate material according to a) in at least a solvent selected from the group consisting of halogen organic solvents, alcoholic solvents, carbonic acid esters, aromatic solvents, ether or ketone, homogenizing the resulting solution, filtrating the solution in a multistep filtration process to free the solution form foreign particulate, gel particles, fibers and undissolved raw material components, and adding the components b) and c).

13. The method of claim 12, wherein the components acting as plasticizer or plasticizer equivalents b) and c) are at least partially added to the solution after the filtration step and before homogenizing the solution, wherein the total plasticizer is less or equal to 25% and the portion of plasticizers according to b) is less or equal to 20%.

14. A method for the production of the multifunctional optically highly transparent film according to claim 1, comprising the following steps, dissolving the cellulose triacetate or the mixture of cellulose triacetates in a solvent mixture of 93% dichloromethane and 7% methanol and stirring for at least 12 hours to realize a fully homogenized solution;

four step filtration of the solution up to a filter mesh width of minimally 2.5 μm;

successive addition of the UV stabilizers—0.53% Phenol, 2-(2H-benzotriazol-2-yl)-4,6-bis(1,1-dimethylpropyl), 0.11% (5(6)-carboxy fluorescein and 0.055% PTCDI N,N-Di-(2,6-diisopropylphenyl)-1,6,7,12-(4-tert.butylphenoxy)-perylen-3,4,9,10-tetracarbonacid diimide (PTCDI)(D-06766), into the finely filtered solution, wherein a period between the addition steps of a homogenizing duration is minimally 15 minutes addition of 8.53% triphenylphosphate as plasticizer, for dissolution and homogenizing during a further 4 hour period, renewed multistep filtration of the solution, subsequent ultra sound degassing and placing the solution onto a circulating stainless steel band by means of a casting tool, drying the resulting film, in a multi-step dryer at a temperature of maximally 150° C. until the required residual moisture is reached and coiling the film.

* * * * *